United States Patent
Chou (10) Patent No.: US 6,327,533 B1
(45) Date of Patent: Dec. 4, 2001

(54) METHOD AND APPARATUS FOR CONTINUOUSLY LOCATING AN OBJECT

(75) Inventor: Yue-Hong Chou, Fountain Valley, CA (US)

(73) Assignee: Geospatial Technologies, Inc., Santa Ana, CA (US)

( * ) Notice: Subject to any disclaimer, the term of this patent is extended or adjusted under 35 U.S.C. 154(b) by 0 days.

(21) Appl. No.: 09/607,876

(22) Filed: Jun. 30, 2000

(51) Int. Cl.[7] .............................. H04Q 7/20; G01S 3/02
(52) U.S. Cl. .................... 701/207; 701/208; 701/209; 701/210; 455/410; 455/457; 455/456; 340/988; 379/59; 343/357
(58) Field of Search ................................... 701/207, 208, 701/212; 342/357.09, 357.13, 419, 457; 455/89, 456; 379/58; 235/380; 415/414

(56) References Cited

U.S. PATENT DOCUMENTS

| | | | |
|---|---|---|---|
| 5,587,715 | * | 12/1996 | Lewis .................................. 342/357 |
| 5,809,396 | * | 9/1998 | Armbruster et al. ............... 455/12.1 |
| 5,841,396 | * | 11/1998 | Krasner ............................... 342/357 |
| 5,920,821 | * | 7/1999 | Seazholtz et al. .................. 455/466 |
| 5,959,577 | * | 9/1999 | Fan et al. ........................ 342/357.13 |
| 6,088,594 | * | 7/2000 | Kingdon et al. .................... 455/457 |
| 6,091,957 | * | 7/2000 | Larkins et al. ..................... 455/456 |
| 6,177,905 | * | 1/2001 | Welch ............................. 342/357.13 |
| 6,185,427 | * | 2/2001 | Krasner et al. ...................... 455/456 |
| 6,222,483 | * | 4/2001 | Twitchell et al. ............... 342/357.09 |
| 6,225,944 | * | 5/2001 | Hayes ................................ 342/357.1 |
| 6,236,365 | * | 5/2001 | LeBlanc et al. ..................... 342/457 |

* cited by examiner

Primary Examiner—William A. Cuchlinski, Jr.
Assistant Examiner—Tuan C To
(74) Attorney, Agent, or Firm—The Hecker Law Group (57) ABSTRACT

A method and apparatus for continuously locating moveable objects is presented. In one or more embodiments of the present invention, moving objects can be tracked in real-time anywhere in the world, including inside tunnels. A smart mobile unit in the object receives and uses GPS satellite positioning data when available and relies on its built-in autonomous navigation capability when GPS is invalid to continuously determine its current position in map-ready units. The smart mobile unit transmits the position output, using an automatically selected wireless mode of communication, to a central processing station for map generation and display processing. Authorized clients may log onto the central processing station to view the object or multiple objects from anywhere in the world; all that is required is a computer equipment with a display device and a web browser. The client enters the object identification number for all the objects for which tracking is desired and the central processing station generates a map of the area where the objects are and sends an image of the map to the browser for display. The display is real-time, however, the client may view past history/trajectory of the objects.

14 Claims, 7 Drawing Sheets

METHOD AND APPARATUS FOR CONTINUOUSLY LOCATING AN OBJECT

BACKGROUND OF THE INVENTION

1. Field of the Invention

This invention relates to the field of computer software and hardware. More specifically the invention relates to a method and apparatus for tracking moveable objects.

2. Background Art

Current systems provide a way to locate and track objects. For example, Automatic Vehicle Location (AVL) systems utilize the NAVSTAR Global Positioning System (GPS) to obtain data that can be used to determine the location of a vehicle. An example of a reference that further discusses GPS is the 1992 book by Tom Logsdon; "The Navstar Global Positioning System," Van Nostrand Reinhold publication, ISBN 0-442-01040-0, which is incorporated herein by reference.

Typical uses of AVL systems provide users such as trucking companies and law enforcement agencies the ability to monitor a fleet of vehicles from a home station. A typical AVL system consists of: one or more mobile units; one or more vehicle monitoring stations; and a wireless communication network. However, there are several limitations and problems associated with current AVL systems. For example, current AVL systems either track vehicles with a substantial time delay (i.e., non-real-time) or provide real-time vehicle tracking within a geographically confined boundary such as within a city. Moreover, such systems lack a mechanism for predicting movement of a vehicle while it is out of communication range with its primary communication network.

The mobile unit (MU) is a piece of hardware installed in the vehicle that is to be monitored. The MU typically contains a GPS receiver and a wireless transmitter. A problem with current MUs is that such devices are not configured to perform calculations related to processing of location information upon data obtained via the GPS receiver. For example, current MUs lack the capacity to convert raw GPS data into a minimum set of map-ready location information. The primary function of current MUs is to transmit GPS position data to a monitoring station. Typically, the MU receives positioning signals from a GPS satellite in the form of code sequences and may convert these code sequences to pseudo range information or standard GPS code (NMEA). Pseudo ranges from a minimum of four different satellites are required in most instances for position calculation. These pseudo ranges or NMEA codes are subsequently transmitted to the monitoring station, via a wireless network, for position calculation.

The vehicle monitoring station is usually computer equipment configured to process GPS data and monitor vehicle locations. These stations perform filtering of the pseudo range signals or raw GPS data transmitted from the MUs and further reduce these ranges to map coordinates for display. Current systems may also perform position corrections by using differential CPS data obtained from a station in the vicinity of the vehicle being monitored. Because of the severe computational burden placed on the computer equipment at the vehicle monitoring station, tracking a large amount of vehicles in real-time requires a substantial amount of processing power. Thus, a limitation of current systems is that such systems require the vehicle monitoring station to perform most of the calculations.

Transmitting GPS data from the vehicle to the vehicle monitoring station requires a wireless communication network. For example, current systems support transmission across cellular systems, satellite uplinks, and other forms of wireless communication. A problem with current systems is that transmission is typically limited to a single communication network. Thus, when the vehicle moves out of range of the communication network location data cannot be reported to the vehicle monitoring station. Usually, time stamped data is sent in packets from the MU to the vehicle monitoring station. Data may also be sent from the object location server to the MU, for example, when the MU desires destination information.

Several utilities derive from AVL technology including: transportation information such as traffic and road conditions, and any other geographic information; and navigation information that provides the driver with locations of destinations, directions, distance, estimated arrival time, and other necessary information. A problem with current systems is that these utilities are not always available because such AVL systems can only work at certain times and in limited locations. For example, current systems can only operate where they have access to a communication network. If, for example, the system uses a satellite, the system cannot effectively operate while a vehicle is moving through a tunnel. Moreover, such systems do not provide real-time vehicle monitoring and vehicle history tracking at all times and at any location.

Some additional problems and limitations of current systems are discussed in further detail below.

Location Data:

If a vehicle (i.e. receiver antenna) is within an obstructed view of the GPS satellites, like in a dense forest, a parking structure, or an underground tunnel, the GPS receiver cannot receive satellite signals, and no GPS data is processed. Also, there is no mechanism for determining where the vehicle traveled to while there was no link between the GPS receiver and the GPS satellite.

Wireless Communication:

If the wireless communication network employed by the AVL system is down, or if the vehicle moves outside of the network's coverage area, there will be no location data available to allow the vehicle monitoring station to determine where the vehicle went while the network was inoperative.

Real-time Access:

Even if current vehicle data is available, if the person who wants to monitor a vehicle cannot access the data, then real-time monitoring is still difficult to perform. Current systems also require that users wishing to view data showing the vehicle location download and install a mapping program in order to be able to display the vehicle location. These maps or mapping programs may have errors and result in erroneous indication of the actual vehicle location. Moreover, in corporations, public agencies, or just an Internet cafe, downloading and installing programs is cumbersome and could be prohibited for security concerns. Thus, there is a need for a system that can access vehicle location data without requiring installation of a client program that is specifically tailored for viewing vehicle location data.

In practice, current AVL technology cannot provide real-time, non-stop global vehicle tracking due to the following constraints:

There exists no single commercial or private wireless communication network that can provide a complete global coverage. Available wireless services have limited coverage areas.

No commercial or private network works all the time. There may be down times associated with available wireless services. These down times may be scheduled like for maintenance, and unscheduled like for failure related problems.

GPS data are invalid in areas not directly exposed to the GPS satellites. For GPS data to be valid, the receiver must be in unobstructed communication with a minimum of four GPS satellites.

GPS data computation, GIS data processing, and mapping are done at a data processing station. In practice, the computational loading on the data processing station is too high for current AVL system to provide a real-time vehicle monitoring for a large number of vehicles or users at the same time.

SUMMARY OF THE INVENTION

This invention describes a method and apparatus for continuously locating moveable objects. In one or more embodiments of the present invention, moving objects can be tracked in real-time anywhere in the world, including inside tunnels. A smart mobile unit in the object receives and uses GPS satellite positioning data when available and relies on its built-in autonomous navigation capability otherwise. Thus, a current position of the object is always available from the smart mobile unit. All position data processing is performed in the smart mobile unit with map-ready outputs stored in history file.

In one or more embodiments of the present invention, the smart mobile unit transmits the map-ready output, via wireless communication, to a central processing station for map generation and display processing. Selection of wireless communication mode is automatic with priority given to terrestrial modes. Satellite communication may be used when no terrestrial conunuication mode is available. Authorized clients may log onto the central processing station to view the object or multiple objects from anywhere in the world; all that is required is a computer equipment with a display device and a web browser. The client enters the object identification number for all the objects for which tracking is desired and the central processing station generates a map of the area where the objects are and sends an image of the map to the browser for display. The display is real-time, however, the client may view past history/trajectory of the objects.

In one or more embodiments of the present invention, the smart mobile unit receives Geographical Information System data, such as destination, routing, traffic, etc. from the central processing station for display in the object.

DETAILED DESCRIPTION OF THE INVENTION

The invention comprises a method and apparatus for continuously locating and tracking a moving object. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Figure 1:
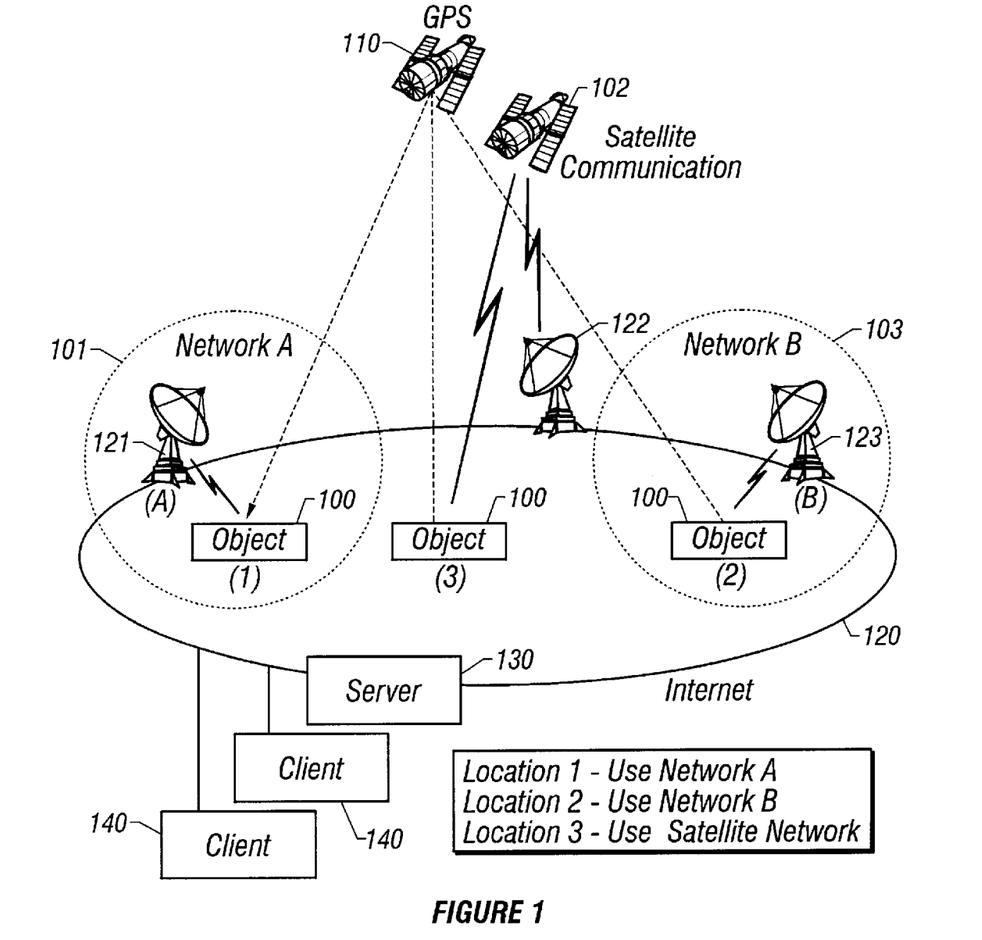
FIG. 1 illustrates an apparatus for continuously locating a moving object according to an embodiment of the present invention.

In one or more embodiments of the invention, the apparatus and methods described herein allows users to continuously track objects throughout the world, in real-time, without a break in the historical data associated with the moving object. FIG. 1 illustrates an apparatus for continuously tracking an object in accordance with one embodiment of the invention.

The apparatus of FIG. 1 comprises object 100. In one or more embodiments of the invention object 100 (e.g., a object or any other type of moving object) is equipped with a Smart Mobile Unit (SMU) which has access to multiple types of communication interconnects. An embodiment of the invention contemplates the use of any type of interconnection fabric that provides one or more suitable communication paths for carrying data between multiple type of computational devices. The interconnect fabric may be-any type of wireless transport mechanism that may act as a carrier wave for data. For example, an embodiment of the invention may utilize a Cellular Digital Packet Data (CDPD) network, a Global System for Mobile (GSM) network, a Mobitex network, and/or any other type of radio, satellite, or wireless communication channel that can establish a link between multiple devices.

In one embodiment of the invention, object 100 is configured to transmit data over wireless communication network 101 via transmitter/receiver station 121, wireless communication network 103 via transmitter/receiver station 123, and/or satellite communication network 102 via receiving station 122. Object 100 may also access GPS constellation satellites 110, communication network 120 (e.g., the Internet), server 130, and client device 140. Object 100 comprises an Smart Mobile Unit (SMU) which is configured to receive location data from a locating source. For example, the SMU may obtain GPS information from the constellation of satellites 110 as object 100 moves through locations (1), (2), and (3). While object 100 is in location (1), it is within the coverage area of network 101. When object 100 is in this location, the SMU communicates with server 130 through wireless communication network 101. In the prior art, communication with the server is lost when object 100 exits the coverage area of network 101. In an embodiment of the present invention, continuous communication with server 130 may be maintained so long as there is a communication channel available. If a communication link is not available the SMU and/or server 130 may predict that approximate whereabouts of the object and use that approximation until the communication link can be reestablished. In one embodiment of the invention this data is stored locally at the object until a connection to the communication network can be re-established.

In one or more embodiments of the present invention, when a communication link is unavailable, the SMU automatically switches to another communication link that is available. However, if no communication link is available, the SMU determines what alternative communication paths are available and uses the next best path. For example, in the illustration of FIG. 1, there is no local network when object 100 is in location 3 therefore the SMU will automatically switch to satellite communication 102 for communication with server 130. Priority is typically given to local wireless communication; however, the user may set a preferred order of priority. In other instances, the priority is predetermined by the maker of the SMU or based on cost, quality, speed, and/or any other factors that are useful to for establishing a communication prioritization scheme.

For example, in one embodiment of the invention when object 100 travels from location (3) to location (2), local wireless communication network 103 becomes available enabling the SMU to automatically switch from satellite communication 102 to network 103. In this example, object 100 maintains constant communication with server 130. Meanwhile, a display mechanism (e.g., a monitor) at client 140 can observe the trajectory of object 100 without interruption, even with loss of valid GPS communication from constellation 110. In one or more embodiments of the invention, continuous tracking is possible because of the autonomous navigation capability built into the SMU. However, an embodiment of the invention does not require constant communication with server 130, but instead may connection to server 130 at periodic intervals. The details of the SMU are discussed in further detail below.

Smart Mobile Unit:

In one or more embodiments of the invention, the SMU is installed in the object that is to be monitored. The SMU may comprise a GPS receiver, processing unit, memory unit, radio modems, operator-SMU interface, security measures, and other devices described in more detail below. It will be evident to one of ordinary skill in the art that other devices not described in this disclosure can be added, subtracted, or substituted to provide the capability to track objects in real-time without interruption.

Figure 2:
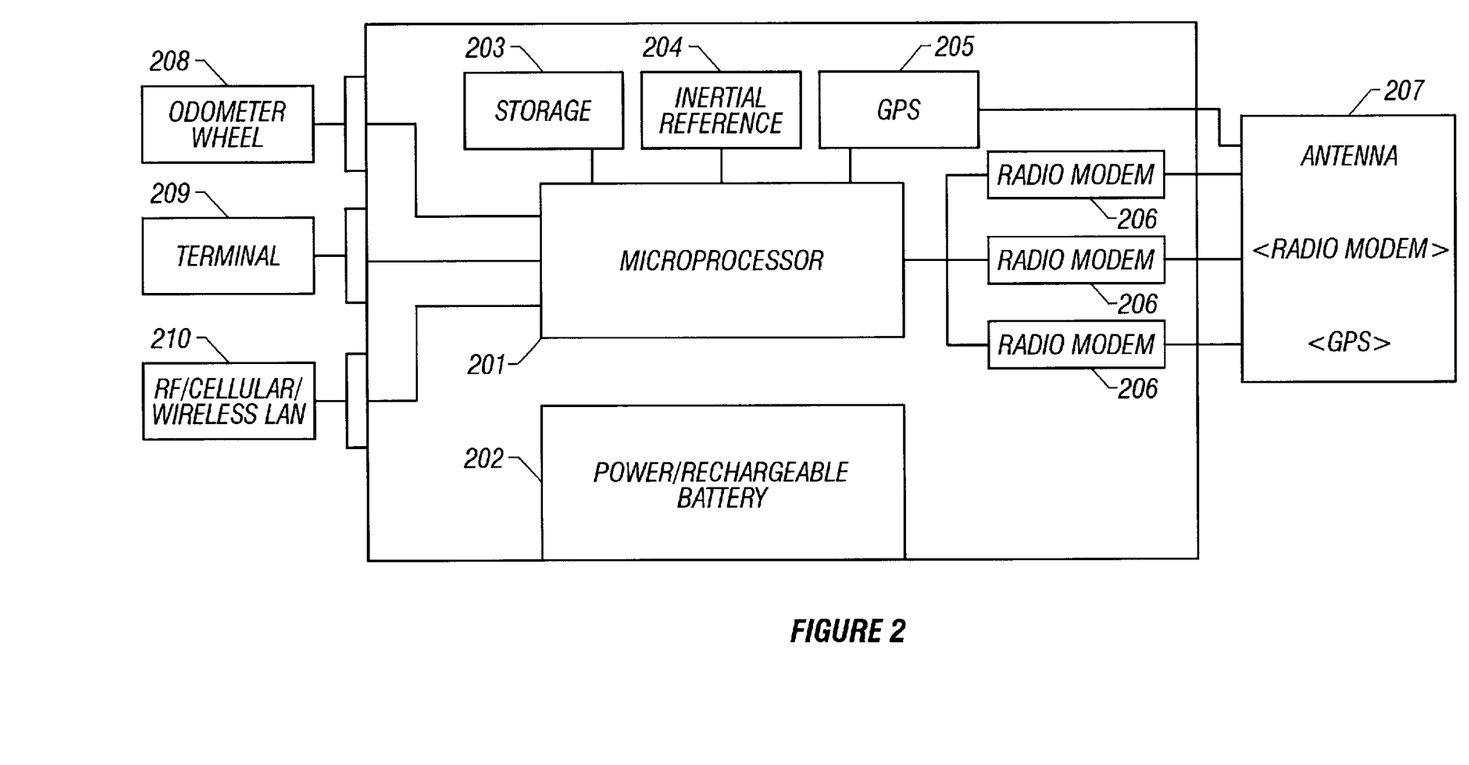
FIG. 2 is a functional illustration of the Smart Mobile Unit according to an embodiment of the present invention.

FIG. 2 is an illustration of the internal components of the SMU in accordance with an embodiment of the present invention. The SMU may comprise, for example a processing unit 201, which may be configured to prepare GPS data for display, in addition to other functions; one or more radio modems 206 for wireless communication; and storage unit 203 for storing historical tracking data. In one or more embodiments of the invention, the SMU contains inertial reference unit 204 which is configured to provide autonomous navigation. An inertial reference unit may comprise a gyroscope an accelerometer, or any other device configured to measure the speed and directional movement of the object being tracked. The SMU may also contain GPS receiver 205; antenna unit 207; external power and rechargeable battery unit 202; and one or more external terminals (e.g., 208; 209 210). Each of these SMU components are discussed further below:

In one embodiment of the invention, processor 201 comprises any processor suitable for providing the computational needs of the present invention. For example, a microprocessor manufactured by Motorola, such as one of the PowerPC family of processors, or a microprocessor manufactured by Intel, such as the 8031, 8051, 80x86, or Pentium family of processors, or a SPARC™ microprocessor from Sun Microsystems™, may suffice. However, the invention contemplates the use of any other suitable microprocessor or microcomputer.

Processor 201 is configured to receive GPS position data from GPS receiver 205. GPS receiver 205 communicates with GPS satellites through antenna unit 207. In one or more embodiments of the invention, antenna unit 207 comprises a plurality of antennae for GPS and radio modem communication. However, antenna unit 207 may utilize a single communication mechanism as well. Processor unit 201 may also receive object inertial data from Inertial Reference unit 204 and/or object speed data from external terminal 208. In one embodiment, object inertial data comprises position, speed, and direction information derived from gyro and/or accelerometer measurements. However, any type of system capable of providing such information may be used for this function. This unit could be built-in or connected via an external connection to the SMU. In one embodiment of the invention, the object speed data may be obtained from devices such as an onboard computer. If the object is a moving vehicle, such data may be acquired from a dedicated wheel speed sensor or from the vehicle odometer.

Figure 3:
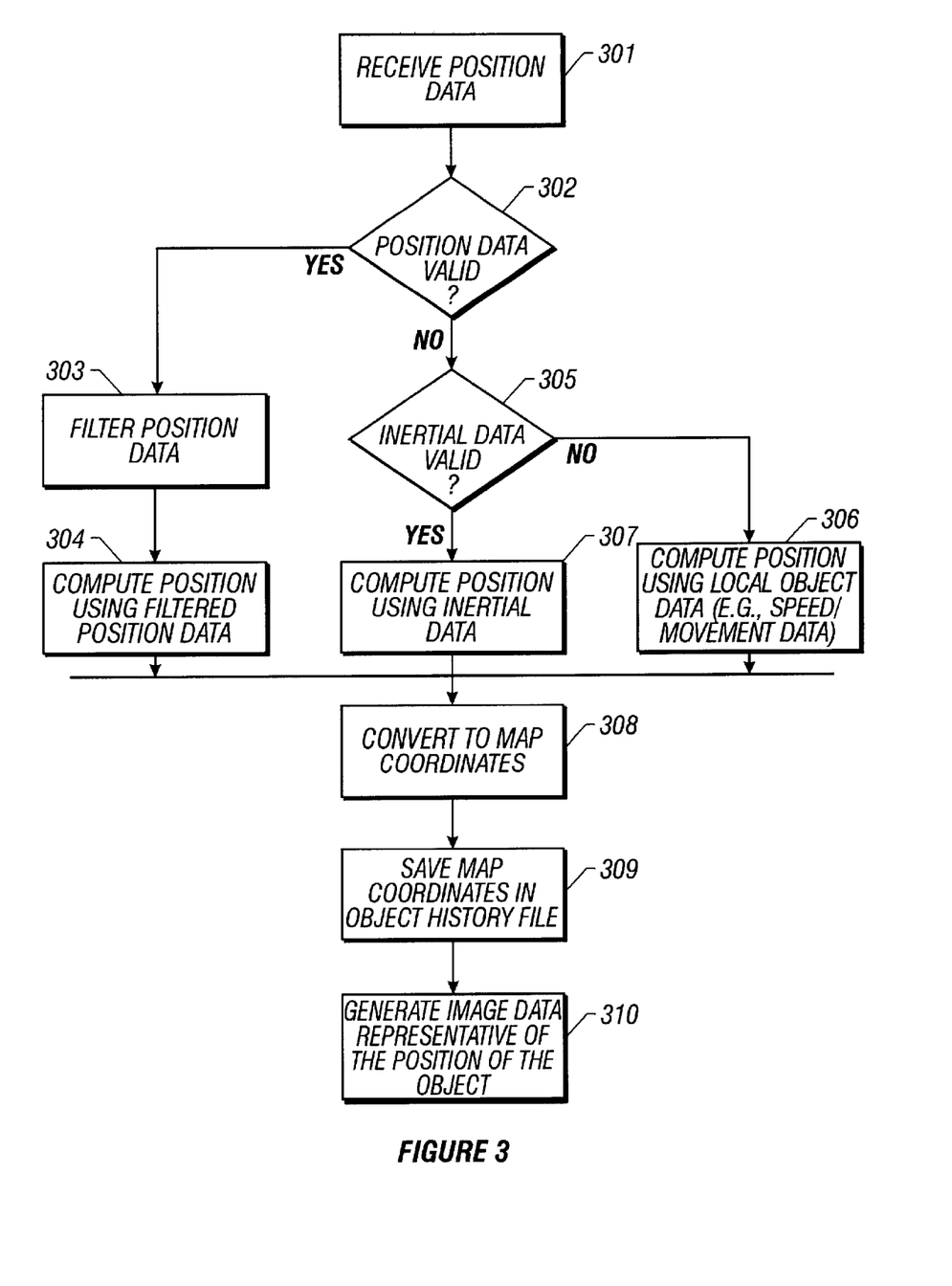
FIG. 3 illustrates processing of position data in the Smart Mobile Unit according to an embodiment of the present invention.

FIG. 3 shows a flow chart of the processing of position data in the SMU in accordance with one embodiment of the invention. At step 301, position data (e.g., GPS data) is received for processing. At step 302, the validity of the position data is ascertained. Invalid data record may be rejected immediately by the SMU. If the data is valid, then filtering may occur at step 303. In one embodiment of the invention, the filtering process eliminates redundant data and/or unnecessary GPS data records. For example, the SMU may eliminate repetitive data. Multiple records that keep repeating a location usually occur when an object is not moving (e.g., a vehicle is stopped). At this point in time, one embodiment of the invention does not accumulate data referring to the same point. Such data may be filtered by the SMU. The system may comprise specific time and/or displacement thresholds for measurement and points within these thresholds may be ignored. At step 304, the object position is computed from the filtered position data. However, it is important to note that in one embodiment of the invention the object position may be calculated directly from the initial position data.

If at step 302, GPS data is not valid, then at step 305 object inertial data is checked for validity. In one embodiment of the invention, object position data is not valid when position data cannot be received from the data source (e.g., the GPS satellite). If the object position data is not valid, then the object position is calculated using inertial data at step 307. If inertial data is not valid or available, then object position is updated at step 306 using local object data. In one embodiment of the invention local object data comprises speed data, movement data, and/or any other kind of data capable of estimate the approximate or exact location of the object. This hierarchical processing prioritizes data from the GPS receiver and allows continuous tracking of the object if GPS data is lost. Data from inertial and object speed sources are used to update object position. Since they are not absolute positions as is the case with GPS data, a starting reference position for these updates is obtained from the object history or may be from user input to the SMU. With this process, autonomous object position update is maintained when GPS data is lost.

At step 308, the new object position data is converted into a format suitable for mapping. For example, in one embodiment of the invention, the data comprises coordinates representing the location of the object. The data may, for example, be converted to decimal degrees expression of Latitude and Longitude, local time and date (GPS data is in Greenwich Mean Time and is converted to local time), standardized measures of speed, direction, and/or elevation. This set of data provides the server with a way to efficiently handle and locate multiple objects. The invention contemplates deriving some or all of the data into a format suitable for mapping. For example, the invention may or may not store elevation data. At step 309, the reduced data set is saved in the object history file at, for example, storage 203 of FIG. 2. In one embodiment of the invention, storage unit 203 comprises sufficient capacity to store object history data for an extended period of time. However, the object history file may be distributed across multiple types of storage devices and/or stored in backup or other storage mediums. For example, in one embodiment of the invention the object history file is stored in multiple repositories. These repositories may be interconnected via any suitable interconnection mechanism (e.g., a system bus and/or a computer network). At step 310, an embodiment of the invention, utilizes the object history file to generate image data representative of the position of the object. For example, the object history file may be utilized to retrace the path of the object during a certain period of time.

Referring back to FIG. 2, processor 201 is capable of handling multiple forms of wireless communication. Examples are Mobitex, Cellular Digital Packet Data (CDPD), Global System for Mobile communication (GSM), Radio Frequency (RF), satellite, cellular and/or Wireless Application Protocol (WAP). However, the invention contemplates the use of any communication mechanism and/or carrier wave capable of transmitting data from one location to another. To handle multiple protocols, the SMU has built-in, a plurality of ports for different modes of wireless communication. For example, the SMU may utilize one or more radio modems 206. Processor 201 also has built-in functions to auto-detect and switch between communication modes. The SMU is easily upgradeable to accommodate additional wireless protocols if such functionality is needed to establish an alternative communication path to the server. The SMU comprises an external input/output (I/O) port 210 for communication through available local cellular network and/or other localized communication links.

Figure 4:
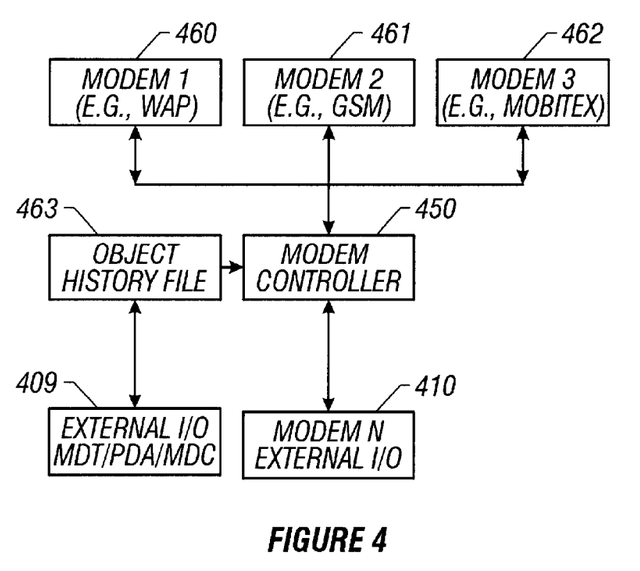
FIG. 4 illustrates processing of object data in the Smart Mobile Unit according to an embodiment of the present invention.

FIG. 4 shows the processing of object history data in the SMU in accordance with one embodiment of the invention. Object data in object history file 463 may be transmitted through an external I/O port to user interface unit 409. Interface unit 409 may be mounted in the object and/or in any other location that is desirable to the user. If there is an external modem 410 or other communication mechanism hooked in to external I/O port, then modem controller 450, in the processor, sends object history data through this port to the server. Otherwise, modem controller 450 automatically detects which wireless network is available and transmits the data through one of radio modems 460, 461, and 462 to the server. If no local wireless network is available, modem controller 450 may transmit the data using an alternative path such as via satellite communication to the server.

User interface unit 409 is configured to receive messages and data from the object location server through an external I/O port. The unit could be a Mobile Data Terminal (MDT), a Personal Data Assistant (PDA), or a Mobile Data Computer (MDC), or any other type of computational device that has a display mechanism. User interface 409 provides a way to display graphic and/or text messages. For example, the user interface may display information such as traffic conditions, street information, and/or dispatcher's messages. The user interface may also be configured to display graphical maps transmitted from the object location server. In one embodiment of the invention, user interface comprises an external I/O that has communication, mapping, routing, image display, and other such functionality.

Referring back to FIG. 2, the power and rechargeable battery unit 202 may provide protection from vandalism and unplanned power interruption. The SMU is configured to automatically lock the object history file the moment the power of the unit is out. The built-in backup rechargeable battery activates whenever there is an unintended interruption in power, and activates the immediate transmission of the object history file to the object location server.

Object Location Server

The object monitoring station, or object location server, comprises computer equipment configured to perform object management functions. For example, in one embodiment of the invention the object location server comprises processes for deriving object location, generating maps, and/or obtaining information requested by a user about a particular object. The system is not typically required to perform position corrections with differential GPS data obtained from a station in the vicinity of the object being monitored. Thus, the load on the object location server is reduced. This allows the object location server to track a large number of objects in real-time. In an embodiment of the invention, the object location server can be implemented as computer software in the form of computer readable code executed on a general-purpose computer. Also, one or more elements of the invention may be embodied in hardware configured for such a purpose.

Figure 8:
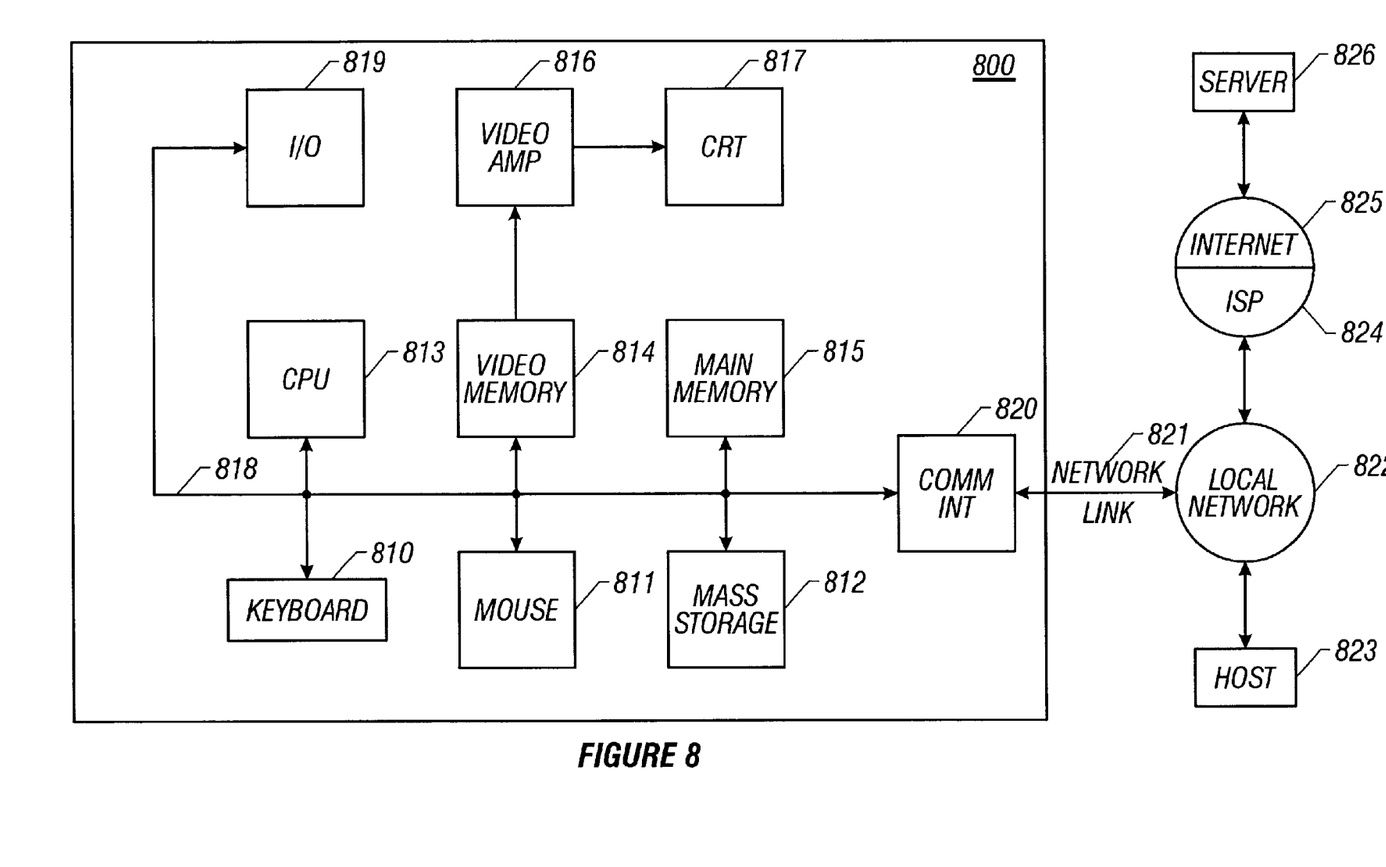
FIG. 8 illustrates the hardware configuration of the object location server according to an embodiment of the present invention.

FIG. 8 illustrates an example of a general-purpose computer that may be utilized to implement an embodiment of the invention. A keyboard 810 and mouse 811 are coupled to a bidirectional system bus 818. The keyboard and mouse are for introducing user input to the computer system and communicating that user input to processor 813. Other suitable input devices may be used in addition to, or in place of, the mouse 811 and keyboard 810. I/O (input/output) unit 819 coupled to bi-directional system bus 818 represents such I/O elements as a printer, A/V (audio/video) I/O, etc.

Computer 800 includes video memory 814, main memory 815 and mass storage 812, all coupled to bi-directional system bus 818 along with keyboard 810, mouse 811 and processor 813. The mass storage 812 may include both fixed and removable media, such as magnetic, optical or magneto-optical storage systems or any other available mass storage technology. Bus 818 may contain, for example, thirty-two address lines for addressing video memory 814 or main memory 815. The system bus 818 also includes, for example, a 64-bit data bus for transferring data between and among the components, such as processor 813, main memory 815, video memory 814 and mass storage 812. Alternatively, multiplex data/address lines may be used instead of separate data and address lines.

In one embodiment of the invention, the processor 813 is a microprocessor manufactured by Motorola, such as one of the PowerPC family of processors, or a microprocessor manufactured by Intel, such as the 80×86, or Pentium family of processors, or a SPARC™ microprocessor from Sun Microsystems™, Inc. However, any other suitable microprocessor or microcomputer may be utilized. Main memory 815 is comprised of dynamic random access memory (DRAM). Video memory 814 may be, for example, a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images. Alternatively, the video memory could be used to drive a flat panel or liquid crystal display (LCD), or any other suitable data presentation device.

Computer 800 may also include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Communication interface 820 could also be a cable modem or wireless interface. In any such implementation, communication interface 820 sends and receives electrical, electromagnetic or optical signals that carry digital data streams representing various types of information.

Network link 821 typically provides data communication through one or more networks to other data devices. For example, network link 821 may provide a connection through local network 822 to local server computer 823 or to data equipment operated by an Internet Service Provider (ISP) 824. ISP 824 in turn provides data communication services through the world wide packet data communication network now commonly referred to as the "Internet" 825. Local network 822 and Internet 825 both use electrical, electromagnetic or optical signals that carry digital data streams. The signals through the various networks and the signals on network link 821 and through communication interface 820, which carry the digital data to and from computer 800, are exemplary forms of carrier waves transporting the information.

Computer 800 can send messages and receive data, including program code, through the network(s), network link 821, and communication interface 820. In the Internet example, remote server computer 826 might transmit a requested code for an application program through Internet 825, ISP 824, local network 822 and communication interface 820. Processor 813 may execute the received code as it is received, and/or stored in mass storage 812, or other nonvolatile storage for later execution. In this manner, computer 800 may obtain application code via a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves. The computer systems described above are for purposes of example only. An embodiment of the invention may be implemented in any type of computer system or programming or processing environment.

Minimum processing of object GPS data on the object location server provides the system with increased capacity. For example, the object location server can provide enough capacity for households to monitor multiple objects (e.g., multiple vehicles). The speed of data processing and the performance of the object location server may require that object GPS data be minimized. For example, the object GPS data may provide a data set which minimizes network traffic, computation and transport delay, and provides for continuous tracking of objects in order of magnitudes greater than is practical with prior art systems.

Figure 5:
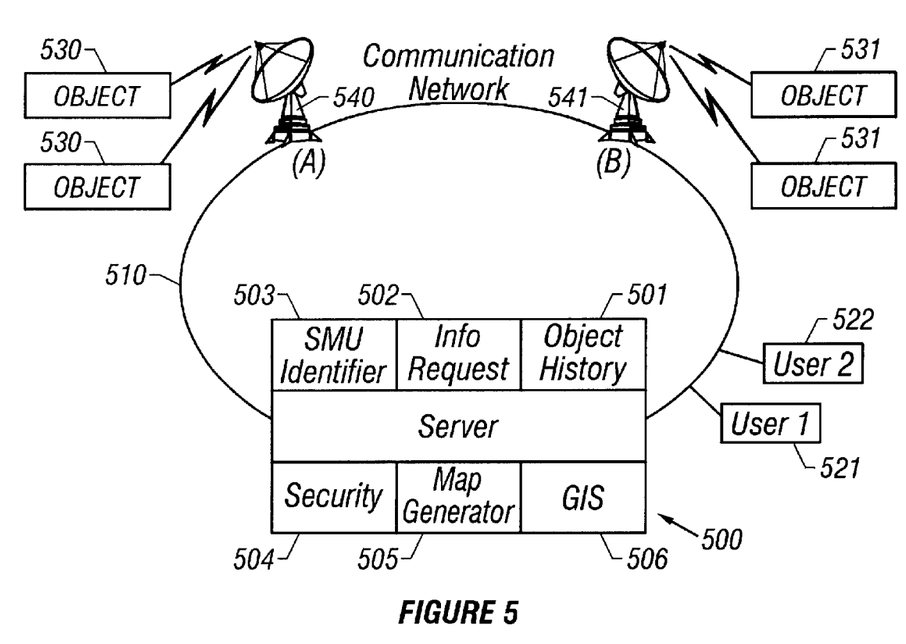
FIG. 5 is a functional illustration of the object location server according to an embodiment of the present invention.

In one embodiment of the invention, the object location server receives object position data from the SMU that is ready for mapping without additional processing. FIG. 5 shows a depiction of the object location server and its connection to a network such as the Internet. Server 500 is connected via network 510 to the SMUs located in object(s) 530 and 531 through wireless service providers 540 and 541. Position data received from the SMUs may be saved in object history module 501. Users 521 and 522 are also connected on the network and are able to track objects 530 and 531 by connecting to server 500 via network 510.

In one embodiment of the invention, communication between any wireless network (e.g., 540 and 541) and the object location server 500 is accomplished using landlines such as communication network 510 (e.g., the Internet), instead of wireless communications. This minimizes the amount of data traffic in the wireless network. However, the invention contemplates the use of multiple types of computer networks. The object GPS data received at the server of the wireless network can be routed to the object location server through existing landlines instead of through the wireless network. This method reduces the amount of wireless data traffic and thereby improves reliability between the SMU and the object location server.

In an embodiment of this invention, network 510 is the Internet. However, any other network suitable for multiple accesses may be used to practice this invention. In one embodiment of the invention, object location server 500 provides security features through security module 504 so that only authorized persons may access the system. In addition, different individuals may be permitted to access data for different groups of moveable objects. For example, a police chief may access the data of all objects in the department while an officer may be authorized to access data for a limited set of objects. In the instance that other types of objects are tracked, the users allowed access to the objects whereabouts, may comprise a constrained subset of users. For example, if the object location server can derive the whereabouts of a child's bicycle, the security module may provide an authentication mechanism that ensures that only parents and/or other authorized family members may use the system to ascertain the whereabouts of the bicycle. In one embodiment of the invention, the object location server may track multiple types of moveable objects. For example, the object location server may locate any object containing an SMU.

Object location server 500 allows for multiple log-ins to the same data set, for example, a fleet manager, user 521, and a dispatch operator, user 522, of the same company may view the same set of objects, 530 and 531, (e.g., vehicles) at the same time from different locations through network 510, as long as both users have valid authorization. SMU identifier module 503 identifies the objects being tracked by users 521 and 522.

In one embodiment of the invention, object location server 500 comprises map generator 505. Map generator 505 may be configured to process image data. For example, map generator 505 may be configured to generate the image containing the position of the object and the image comprising the area surrounding the object (e.g., a certain region of a map). A subset of the generated image, or an entire representation of the map image, may then be displayed to users 521 and 522 via network 510. Map generator 505 comprises a fully functional, network ready, mapping system. The map generator is configured, in one embodiment of the invention, to utilize the position data associated with the object to derive an image. For example, the map generator may use the position coordinates to render a map associated with that particular position. This may be accomplished by using vector graphics processing or any other technique for converting textual data into image data.

In one embodiment of the invention, the map is transmitted directly to the user thereby eliminating the need for the user to download and install third party mapping programs. This ensures that the output map files to be accessed by the user are in the graphical format capable of being displayed at the user site. Thus, the object location server generates image files in a format compatible with the user's Internet access program (e.g., JPEG, GIF, etc . . . ).

Figure 6:
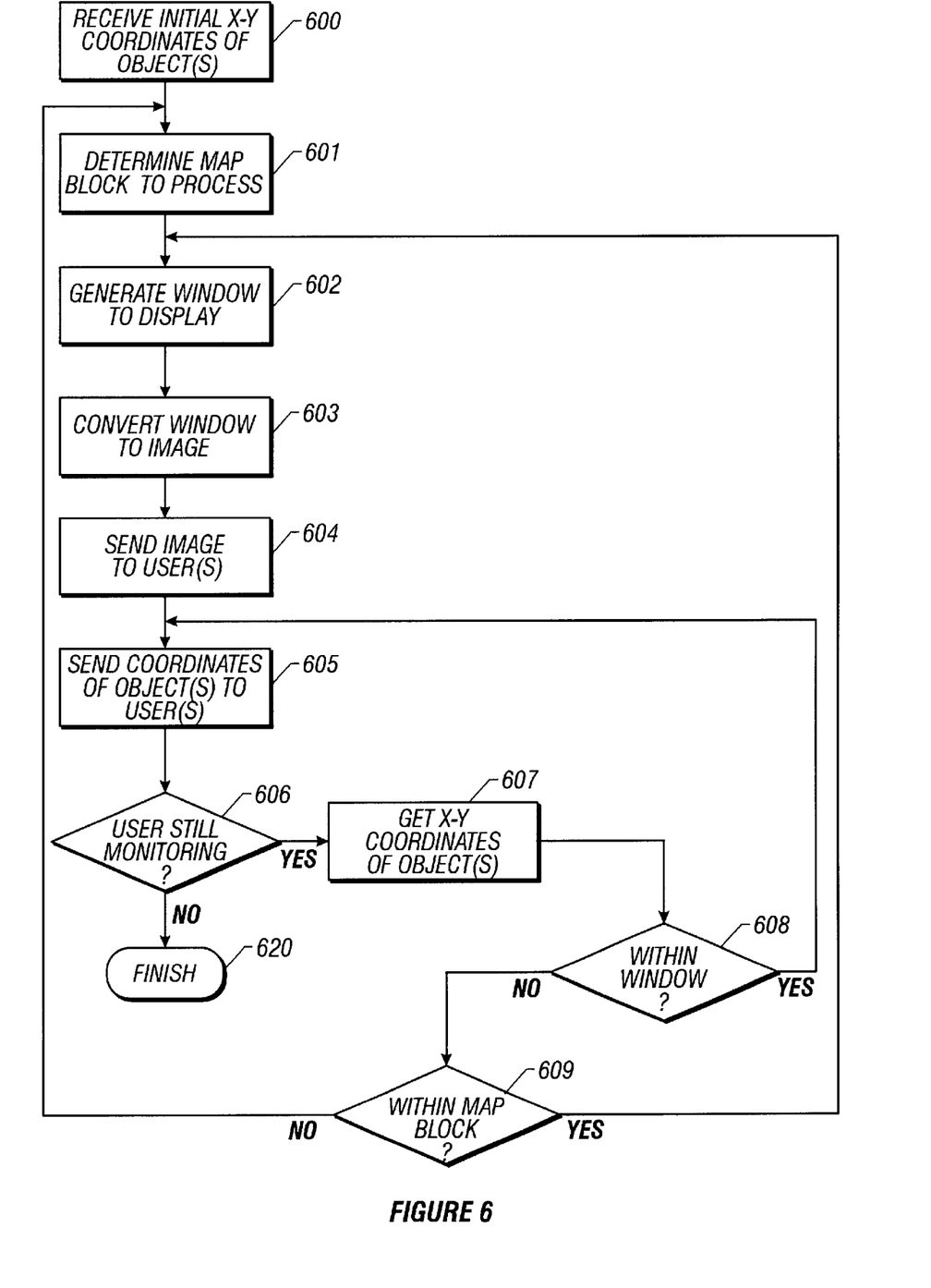
FIG. 6 illustrates map generation in the object location server according to an embodiment of the present invention.

FIG. 6 shows a flow diagram of the map display generation process in accordance with one embodiment of the invention. At step 600, the object location server receives the X-Y coordinates of the object(s) being tracked. The data is the GPS object position converted to decimal degrees of Latitude and Longitude, or any other coordinate representations, in the SMU. At step 601, the server determines the map block to be processed from the x-y coordinates of the object(s). At step 602, it generates a display window that encompasses the object(s) to be tracked. The display window vector data is then converted to image data at step 603 and subsequently sent to the user at step 604. The window may be a whole or partial representation of the map associated with the object that is being tracked. At the user's terminal, the map window is displayed. In one embodiment of the invention, this map display can be zoomed for closer look. For example, if the image data is sent as a Java™ applet, then the applet allows local manipulation of the image.

At step 605, the coordinates of all the objects are sent to the user and superimposed on the map. If at step 606, the user is still monitoring the objects, then the new positions of the objects are obtained from the history file at step 607 and if the new x-y coordinates are within the current window, check performed at step 608, the new object coordinates are sent to the user at step 605. In this manner, movement of the objects are tracked, in real-time, as they move within the window. So long as the objects are still within the window, only x-y coordinate data is being sent to the user. Network traffic and the object location server workload are significantly reduced. The user sees a clear image on the display device.

However, if at step 608, the new x-y coordinates are outside the current window, a check is made at step 609 to ascertain the validity of the map block. A new window is generated at step 602 if the map block is still valid, otherwise, the process returns to step 601 to obtain a new map block. The newly generated window is sent to the user and the process continues until the user logs off the system at step 620.

In an embodiment of the present invention, differential corrections of GPS data may be eliminated. Prior art AVL technology is based on the assumption that the Selective Availability (SA) intentionally introduced by US DOD remains the major error source. Without SA, the accuracy of GPS data has improved from the previous 100 meters to 10 meters. As a result, differential corrections become needed only for high accuracy applications such as engineering measurements. For global object tracking, 10-meter accuracy is more than adequate. As such, one or more embodiments of this invention remove all the unnecessary differential corrections and substantially reduce the computational burden on the server. Therefore, the X-Y coordinates received from the SMU are used without additional processing.

Referring back to FIG. 5, the Geographic Information System (GIS) 506 may be used to organize and manipulate a various kinds of geographic information. In one embodiment of the invention, object location server 500 uses functions of GIS 506 to link the object GPS data to any information relevant to the user's needs, including traffic conditions, road conditions, object data, driver's information, and others. Information request module 502 processes all information to the GIS system. Upon request for GIS data, the object location server processes the database and generates the requested transportation or navigation information, such as a specific location, traffic conditions, road conditions, route information, etc. and transmits the generated data in the form suitable for the SMU to receive and display, depending on the external output device installed in the object such as MDT, PDA, or MDC. A more detailed discussion of GIS, which is incorporated herein by reference, may be found in the 1997 book entitled "Exploring Spatial Analysis in Geographic Information Systems," Onword Press, ISBN 1-56690118-9.

Thin-Client

The Thin-client makes it possible for one embodiment of the invention to view objects reliably in real-time by eliminating the need for a third party mapping tool at the viewing station (e.g., thick-client). The thin-client concept is based on having all the essential display functions generated by the object location server. However, the invention contemplates the use of any type of client device that is capable of executing, in either hardware or software, code that embodies the invention. To track an object, the user may utilize a display device and a network browser such as Internet Explorer or Netscape Navigator. However, an embodiment of the invention may be implemented with any other browser software that allows access to the Internet. It is this thin-client approach that makes it possible for any user to receive and display location information about any moving objects using such devices as hand-held computers, PDA, or even web-enabled cellular phones.

The thin-client user is able to log in to the Internet object location server, enter a password, specify one or more objects to track, and the Internet object location server may generate a map showing locations of the specified objects if the user is authorized to track them. Thin-client allows the user to conduct basic mapping functions on the browser, such as zoom-in, zoom-out, pan, map center, label streets, etc.

Separate functions allow the user to specify a window of date and time to retrieve object history. This ensures that the user can find the location of the object any time and anywhere.

Wireless Communication

In one embodiment of the invention, transmitting GPS data from the tracked object to the object location server may require a wireless communication network such as cellular, satellite, and other forms of wireless communication. The invention contemplates the use of time stamped data is sent in packets to the object location server from the SMU for processing. Data may also be sent from the object location server to the SMU, for example, when the SMU desires destination information from the GIS.

The wireless communication environment is characterized by the existence of multiple commercial networks, such as Mobitex, CDPD, GSM, and numerous agency-specific private RF or Wireless LAN (Local Area Network) networks. In addition to these terrestrial communication networks, satellite communication is also available at a much higher cost.

To accommodate these different networks, an embodiment of the present invention incorporates in the SMU a built-in capability to automatically switch between communication networks in order to maintain a continuous coverage of an object through the different networks. Currently, different communication networks require different radio modems with different protocols. However, one or more embodiments of the invention contemplate the use of a standardized Wireless Application Protocol (WAP) so that switching between networks can be implemented in a communication device such as cellular phones. Other embodiments of this invention may be implemented with other standardized or proprietary communication protocols.

Figure 7:
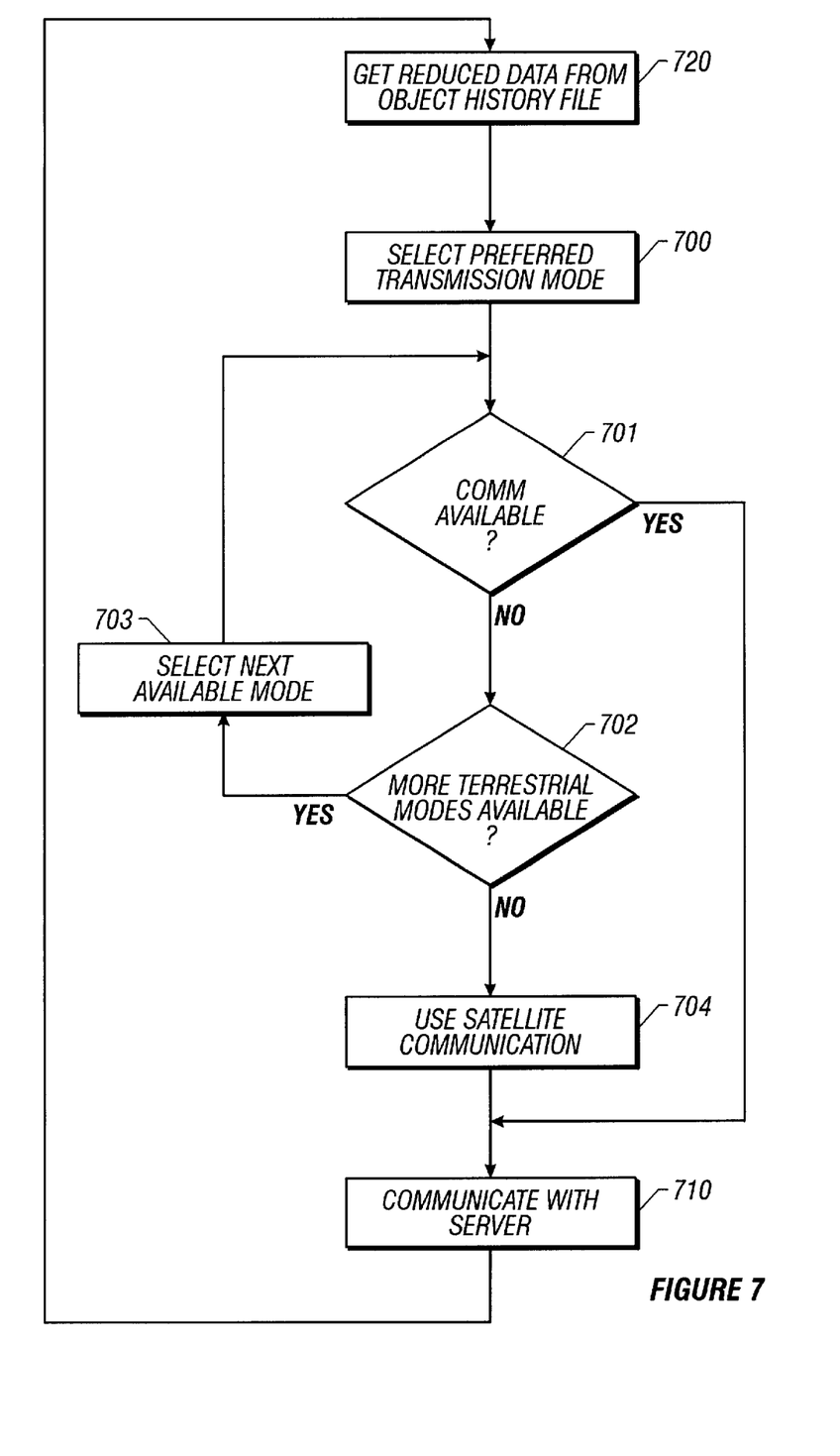
FIG. 7 illustrates automatic wireless conununication mode selection in he Smart Mobile Unit according to an embodiment of the present invention.

FIG. 7 is a flow chart showing the automatic switching process utilized with an embodiment of the present invention. In this configuration, the SMU is configured with three ports available for wireless communication: two radio modems and one external I/O port for wireless communication. At step 700, the preferred mode of communication is selected for transmission of object history data 720. The SMU attempts to communicate using the radio modem assigned to the preferred mode at step 701. This mode of communication remains in effect if clear communication is established and persists by proceeding to step 710. However, if the communication is unsuccessful, the SMU may attempt communication using the next (or second) mode in the hierarchy at step 703. If the second mode of communication is unsuccessful, as determined at step 701, the SMU attempts the third mode of communication, again at step 703. This process continues until all terrestrial modes of communication are exhausted. At step 704, satellite communication is utilized for communication with the object location server.

Another embodiment may include pinging the various radio modems to ascertain the communication networks that are available for use. The available modes are then prioritized for use in accordance with the method of FIG. 7.

The Smart Mobile Unit described above has a minimum of three I/O ports, two internal and one external, for implementation of two different radio modems inside the hardware with one additional port for a third mode. Since the microprocessor is capable of automatically detecting and switching between communication networks, the SMU can be expanded to have more than three I/O ports by adding radio modems whenever necessary. In most cases, however, two internal ports plus one external port provide the capability of a global non-stop wireless communication. In one embodiment of this invention, the SMU incorporates versatile wireless communication capability that includes the main terrestrial and satellite communication. In one embodiment of the invention an internal I/O port in the SMU connects to the most complete terrestrial digital wireless network, for example, Mobitex in North America or GSM in Europe and Asia. Another internal I/O port in the SMU connects to a satellite wireless communication network. In one embodiment of the invention, the satellite network is activated only if all other modes of wireless communication fail. However, in other embodiments of the invention the satellite network may be used in other instances. For example, the satellite may provide a regular communication link to the SMU.

An external I/O port connects to localized communication network such as RF or Wireless LAN (Local Area Network). The external port can be set to have the highest priority and it may be used more frequently if the mode exists and functions appropriately. The user and/or manufacture can alter the priority so that any other communication mode can be set as the default mode. The user and/or manufacture may prioritize the use of wireless communications according to a prioritization scheme. For example, communication may be prioritized according to cost, clarity, and/or any other set of factors. In an embodiment, the user may assign highest priority to localized network such as RF or Wireless LAN, then next higher priority to common terrestrial digital network, and the satellite network for backup.

The external I/O port can also support any digital cellular communication. For instance, a user who has no access to a local RF or Wireless LAN network still can use the digital cellular network for this purpose. As such, just a digital cellular phone will provide the needed communication.

What is claimed is:

1. A method for continuously locating an object comprising:
   obtaining initial position data at an object indicating a location of said object;
   determining if said initial data is valid;
   processing said initial data in said object to derive filtered position data, wherein said processing occurs when said data is valid;
   obtaining inertial data when said initial data is invalid;
   using said inertial data to compute new position data at said object; storing said new position data at said object in a data repository.

2. The method of claim 1 wherein said data repository comprises an object history file.

3. The method of claim 1 wherein said inertial data comprises data representative of the speed at which said object is moving.

4. The method of claim 1 wherein said inertial data comprises data representative of the directional movement of said object.

5. The method of claim 1 further comprising:
   obtaining said new position data from said data repository;
   transmitting said new position data to a processing station via a communication network;
   using said filtered position data to generate at said processing station a file representative of said moveable object.

6. The method of claim 1, wherein said new position data comprises a coordinates representing the location of said object.

7. The method of claim 1 wherein said new position data comprises a time and date of the geographical location of said object.

8. A computer program product comprising:
   a computer usable medium having computer readable program code embodied therein, said computer readable program code configured to continuously locate an object comprising:
   computer readable program code configured to receive at an object data indicating an initial location of said object;
   computer readable program code configured to process said location data in said object to derive a first position;
   computer readable program code configured to determine if said location data is valid;
   computer readable program code configured to obtain inertial data when said location data is invalid;
   computer readable program code configured to use said inertial data to associate a second position with said object;

computer readable program code configured to store said second position at said object in a data repository.

9. The computer program product of claim 8 wherein said data repository comprises an object history file.

10. The computer program product of claim 8 wherein said inertial data comprises data representative of the speed at which said object is moving.

11. The method of claim 8 wherein said inertial data comprises data representative of the directional movement of said object.

12. The computer program product of claim 8 further comprising:

computer readable program code configured to obtain said second position from said data repository;

computer readable program code configured to transmit said second position to a processing station via a communication network;

computer readable program code configured to use said second position to generate at said processing station a file representative of said moveable object.

13. The computer program product of claim 8, wherein said second position comprises a coordinate representing the new location of said object.

14. The computer program product of claim 8 wherein said second position comprises a time and date of the geographical location of said object.

* * * * *